Dec. 30, 1969    T. KOLK ET AL    3,486,592

RAIL VEHICLE BRAKE SYSTEMS

Filed April 12, 1968    2 Sheets-Sheet 1

INVENTORS
THEODOR KOLK and
WILHELM WERTELEWSKI

BY
ATTORNEYS

Dec. 30, 1969    T. KOLK ETAL    3,486,592
RAIL VEHICLE BRAKE SYSTEMS

Filed April 12, 1968    2 Sheets-Sheet 2

INVENTORS
THEODOR KOLK and
WILHELM WERTELEWSKI

BY
ATTORNEYS

United States Patent Office 3,486,592
Patented Dec. 30, 1969

3,486,592
RAIL VEHICLE BRAKE SYSTEMS
Theodor Kolk, Datteln, Westphalia, and Wilhelm Wertelewski, Waltrop, Westphalia, Germany, assignors to Becorit Grubenausbau G.m.b.H., Recklinghausen, Germany, a German company
Filed Apr. 12, 1968, Ser. No. 721,004
Claims priority, application Germany, Apr. 12, 1967, B 92,022
Int. Cl. B61h 7/12
U.S. Cl. 188—181                         7 Claims

ABSTRACT OF THE DISCLOSURE

A rail vehicle including a braking system which is actuated in accordance with the speed of the vehicle and having a wheel engaging one side of the rail and driving a centrifugal clutch for actuating the brakes when the vehicle exceeds a predetermined speed, and a counter wheel engaging the opposite side of the rail to compensate lateral forces arising from engagement of said rail by said driving wheel, the driving wheel and the counter wheel being pressed against the rail independently of the main running wheels of the vehicle which transmit the weight of the vehicle to the rail.

BACKGROUND OF THE INVENTION

Field of the invention

This invention relates to a rail vehicle having a brake which is actuated by a device responsive to the speed of travel of the vehicle. Such device can serve to brake the vehicle when it exceeds a predetermined maximum speed.

Description of the prior art

It is known that the brakes of such vehicles can be actuated by a centrifugal brake actuating device which is driven from a wheel pressed into contact with the rail on which the vehicle runs by the weight of the vehicle, that is to say the wheel comprises one of the load bearing wheels which are hereinafter referred to as "main wheels." It often happens, especially with such rail vehicles which travel on a single rail when the main wheels are mounted on the vehicle without resilient suspension, that one of such wheels temporally loses contact with the rail. This may be due to undulations or irregularities on the running surface of the rail, or to the fact that the several main wheels of the vehicle are pressed with an uneven force against the running surfaces of the rails due to the uneven distribution of the weight of the vehicle or of the load carried thereby. If the main wheel which serves to drive the centrifugal brake actuating device temporally loses contact with the rail such device either ceases to be driven or is driven only irregularly or with reduced speed. Consequently the brake of the vehicle may not always be operated when the vehicle exceeds the predetermined speed. This leads to a risk of serious accidents, especially when the vehicles are used on inclined rail sections, as is usually the case with monorail conveyors used in underground mine workings.

The aim of the invention is to eliminate these hazards.

SUMMARY OF THE INVENTION

According to the invention we provide a rail vehicle having a brake which is actuated by a device responsive to the speed of travel of the vehicle, wherein the brake actuating device is driven from a wheel which is mounted on the vehicle in such a manner as to be pressed continuously against the rail independently of the main wheels which transmit the weight of the vehicle onto the rail, and in addition to said driving wheel for the brake actuating device there is provided a similar counter wheel which is mounted on the vehicle in such a manner as to be pressed continuously against the rail on the side thereof remote from the driving wheel for the brake actuating device and substantially opposite thereto also independently of the main wheels which transmit the weight of the vehicle onto the rail.

The advantage of driving the brake actuating device from a wheel which is pressed continuously against the rail independently of the main wheels arises from the fact that the main wheels can temporarily lose contact with the rail under some circumstances as aforesaid so that the brake actuating device would not then at all times receive an input truly indicative of the speed of the vehicle. The advantage of providing a counter wheel is that any force applied to the rail by the driving wheel for the brake actuating device is opposed by a substantially equal and opposite force applied by such counter wheel on the other side of the rail so that any forces which could tend to cause the vehicle to rock or sway laterally are compensated by the counter wheel so that the stability of the vehicle is ensured.

Preferably the driving wheel for the brake actuating device and the counter wheel are both mounted so as to be swingable towards and away from the rail about respective parallel axes.

The driving wheel for the brake actuating device and the counter wheel may be resiliently coupled, for example by means of a tension spring.

This enables contact to be maintained between these wheels and the rail surface even when there are serious irregularities on the rail surface, as is especially the case where the rail consists of lengths of single rails interconnected in an articulated manner as for example with overhead monorails or even floor mounted monorails. With this arrangement the driving wheel for the brake actuating device remains in permanent contact with the rail even whilst the vehicle is negotiating curves and points. This ensures that the brake actuating device is driven constantly at a speed corresponding to the speed of travel of the vehicle, and that the brake is certain to be released if the vehicle exceeds a predetermined maximum speed. This is of importance even with vehicles which have their own driving motor and carry a driver, and well as with vehicles which are advanced by means of towing ropes and do not carry a driver but are controlled by the towing rope drive, the latter being situated several hundred yards from the vehicle according to the position of the latter along the track. These vehicles can exceed a predetermined maximum speed if the towing rope, or the connection of the vehicle to the towing rope, breaks and this can lead to serious accidents if the vehicle is not brought immediately to a standstill by an automatic brake.

Resilient coupling between the driving wheel for the brake actuating device and the counter wheel ensures that on encountering surface irregularities in the rail the two wheels are free to move towards and away from each other as necessary without in any way impairing either the compensating action of the counter wheel or the operation of the brake actuating device.

One form of brake actuating device which may advantageously be employed comprises a centrifugal clutch having an input element mounted for rotation by said driving wheel, an output element which is normally held stationary by a releasable catch, and a clutch member carried by said input element so as to be movable radially with respect thereto and biased radially inwardly so that said clutch member is moved radially outwardly only when the input element is rotated at greater than a predetermined rate so that frictional engagement between the clutch member and said output element then causes the latter to rotate, a trip member associated with the centrifugal clutch being arranged so as to be operated upon rotation of said output element to cause the brake to be applied.

Where the brake actuating device comprises such a centrifugal clutch, it is a further feature of the present invention that the output element of the centrifugal clutch comprises a substantially cylindrical outer housing having secured thereto an inclined annular plate or other means defining a helical actuating surface, the trip member comprising a lever which is biased into contact with said actuating surface.

Preferably the lever is mounted so as to be pivotable about an axis extending transversely of the axis of rotation of the counter wheel, the lever being disposed vertically in alignment with the latter. This arrangement is particularly compact and avoids the necessity for complex transmission members, as is especially desirable where the rail vehicle is intended for use in underground mine workings.

It is of particular advantage to make the running surfaces of the driving wheel for the brake actuating device and of the counter wheel from a wear resistant synthetic resinous or plastics material with a high co-efficient of friction. This not only ensures that the wheel is driven safely by the contact with the rail, but the formation of sparks is prevented, which is of importance especially in underground workings or in other explosion prone areas.

BRIEF DESCRIPTION OF THE DRAWINGS

The invention will now be described by way of example with reference to the accompanying drawings wherein.

DESCRIPTION OF THE PREFERRED EMBODIMENT

Figure 3:
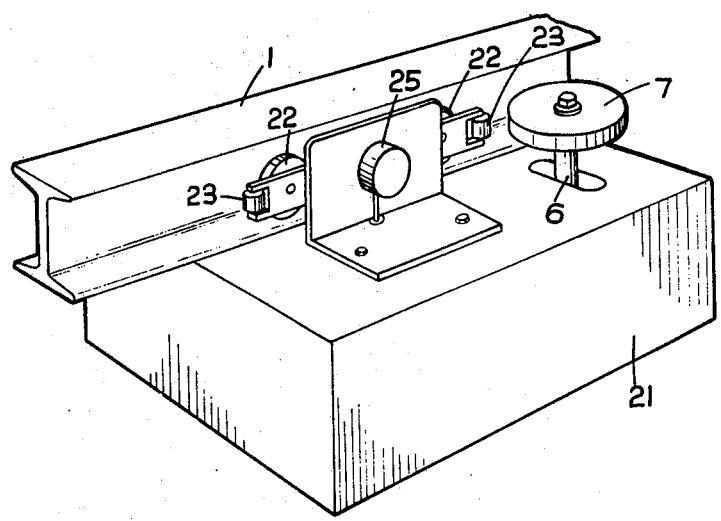
FIGURE 3 is a perspective view of a rail vehicle to which the invention is applied.

For the purposes of description the invention is illustrated as applied to a rail vehicle adapted to run on an overhead monorail of which the track composes a rail 1 of I-shape in section comprising a vertical web 1a and a horizontal running flange 1b at the lower edge of the web. The rail vehicle is shown in FIGURE 3 and includes a body structure 21 which contains various components of a hydraulic braking system hereinafter described together with a brake actuating device responsive to the speed of travel of the vehicle. The vehicle also includes two pairs of main wheels 22 engaging the upwardly presented sides of the running flange 1b on opposite sides of the web 1a, only those on one side of the web being seen in FIGURE 3. Additionally the vehicle includes two pairs of stabilizing wheels 23 which engage the web 1a of the rail 1. If the vehicle is provided with a driving motor it will also be equipped with traction wheels preferably spring loaded into engagement with the web of the rail and driven from the motor.

Figure 4:
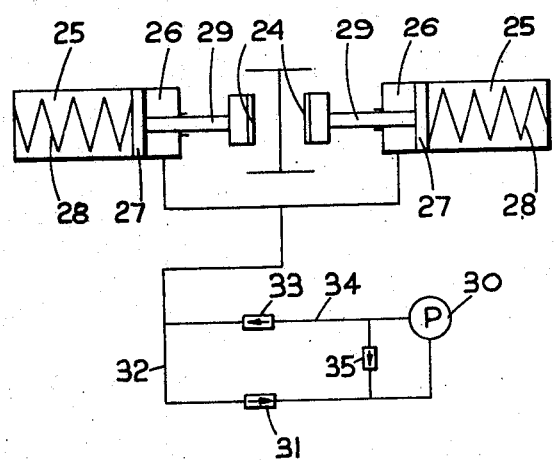
FIGURE 4 is a digarm showing the hydraulic circuit for the brake system of such a vehicle.

The braking system includes a pair of brake pads 24 (FIGURE 4) presented towards opposite sides of the web of the rail and carried by respective spring loaded piston and cylinder units 25 so arranged that the brake pads 24 are normally pressed into contact with the web of the rail and can be retracted therefrom by the application of fluid pressure to chambers 26 within the units. It will be understood that application of fluid pressure to the chambers 26 displaces the pistons 27 outwardly against the force of springs 28 so that the brake pads 24 which are carried at the outer ends of piston rods 29 are retracted from engagement with the web 1a of the rail.

The source of fluid pressure comprises a hydraulic pump 30 which may be operated either manually by means of a hand lever or mechanically by a driving connection from the driving motor when the vehicle is equipped with such.

The application of the brakes, i.e. the release of fluid pressure from the chambers 26, is controlled by a pressure release valve 31 connected in a pipe line 32 extending between the chambers 26 and the inlet side of the pump 30. The brake pads 24 are retracted from engagement with the web of the rail 1 by the supply of fluid under pressure from the outlet side of the pump 30 through a non-return valve 33 in a pipe line 34 which leads from the outlet of the pump and joins the pipe line 32 leading to the chambers 26. A relief valve 35 connects the outlet and inlet sides of the pump 30 so that when a predetermined pressure is established in the chambers 26 continued actuation of the pump 30 does not cause excessive pressure to be developed within the chambers 26.

The valve 31 is normally closed and is arranged to be opened either manually when determined by an operator or automatically when determined by a speed responsive brake actuating device as now described.

Figure 1:
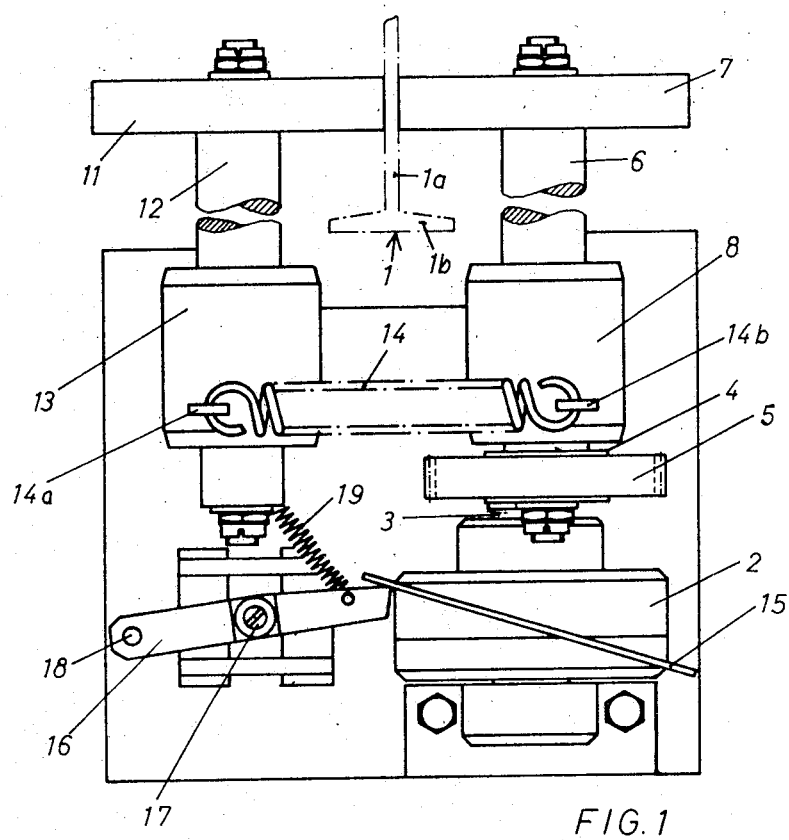
FIGURE 1 is a fragmentary view in front elevation showing the arrangement of brake actuating device, driving wheel for the same, and counter wheel, as applied to a rail vehicle running on an overhead monorail.
Figure 2:
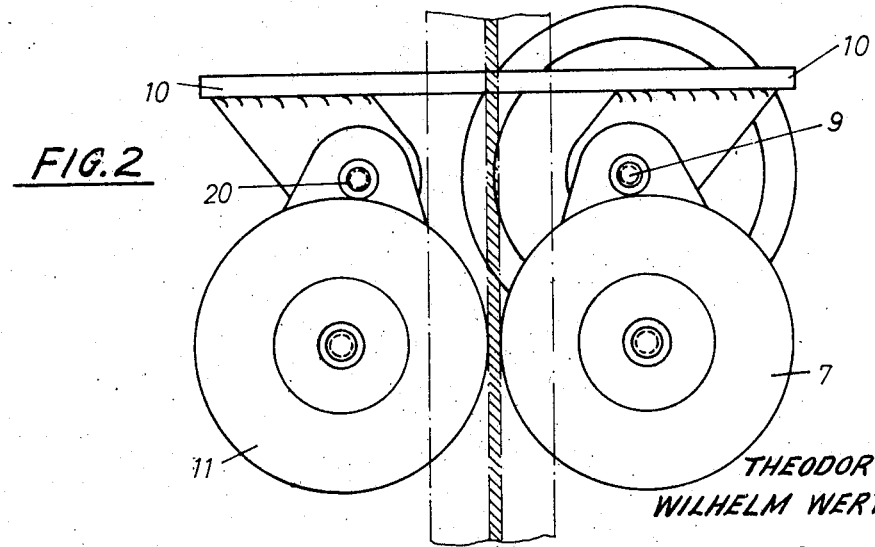
FIGURE 2 is a fragmentary plan view corresponding to FIGURE 1.

Referring now to FIGURES 1 and 2, the brake actuating device for controlling the valve 31 comprises a centrifugal clutch device 2 of generally known construction. Such device includes an input element in the form of a driving shaft 3 which is driven through a pinion 4 meshing with a gear wheel 5 carried at the lower end of a vertical shaft 6. At its upper end the vertical shaft 6 carries a wheel 7 which is non-rotatable relative to the shaft and is provided with a suitable facing of a synthetic plastics material on its peripheral face which engages the web 1a of the rail 1.

The shaft 6 is rotatably mounted in a bearing assembly 8 which is itself swingable about a bolt 9 extending parallel to the shaft 6. This bolt is mounted on a lug carried by a plate 10 which extends beneath the rail 1 on both sides thereof.

A counter wheel 11, generally similar to the wheel 7, is mounted at the upper end of a vertical shaft 12 for rotation therewith. The shaft 12 is disposed on the opposite side of the rail 1 from the shaft 6 and is rotatably mounted in a bearing assembly 13 which is itself swingable about a bolt 20 parallel to the shaft 12 and mounted on a lug also carried by the plate 10. The counter wheel 11 thus engages the side of the web 1a remote from the wheel 7 and is disposed substantially opposite thereto.

The wheels 7 and 11 are resiliently coupled indirectly, via the respective shafts 6 and 12 and bearing assemblies 8 and 13, by means of a tension spring 14 connected to respective lugs 14a and 14b on the bearing assemblies. The spring is of such a length when unstressed that the wheels 7 and 11 are pressed resiliently against opposite side faces of the web 1a. The lugs 14a and 14b to which the tension spring 14 are secured may be adjustable longitudinally of the spring so as to allow the spring to be pre-tensioned variably in accordance with varying operational requirements.

The internal construction of the centrifugal clutch 2 is not illustrated in detail since, as mentioned previously, it is conventional. The output element of the clutch 2 comprises a substantially cylindrical outer housing which is normally held stationary by a releasable catch disposed internally thereof. A clutch member is carried by the input element comprising the driving shaft 3, such clutch member being disposed internally of the housing and mounted so as to be movable radially with respect to the input element in such a manner that it is moved outwardly by centrifugal action so as to release the catch and engage the inner surface of the outer housing only when the input element is rotated at greater than a predetermined rate. Thus when the vehicle exceeds a predetermined speed as measured by the wheel 7 which is driven by frictional engagement with the web of the rail 1, the clutch member is moved into frictional engagement with the output element so that the latter is driven from the input element and caused to rotate.

To actuate the brakes a trip member is provided in association with the centrifugal clutch 2 and is arranged so as to be operated upon rotation of the output element of the clutch. For this purpose the outer housing of the centrifugal clutch 2 has secured thereto an inclined annular plate 15 which defines a helical actuating surface. The trip member comprises a lever 16 which is pivotally mounted intermediate its ends on a horizontal pivot pin 17. The lever 16 is disposed beneath the lower end of the shaft 12, and a tension spring 19 extends between an extension of the bearing assembly 13 and the lever 16 so as to pull one end of the lever upwardly into contact with the underside of the inclined plate 15. Thus the lever 16 is pivotable about an axis which extends transversely of the axis of rotation of the counter wheel 11 while being disposed in vertical alignment with the latter in a particularly space saving relation. The lever 16 is preferably mounted directly on the control valve 31 so as to minimize any delay in the transmission of movement from the lever to the valve.

In operation, the wheel 7 is pressed onto the web 1a of the rail by the action of the spring 14 and is rotated at a rate dependent on the speed of the vehicle along the rail. If a predetermined maximum speed is exceeded, which maximum speed may be adjustable, the outer housing of the centrifugal clutch 2 is coupled drivingly with the input shaft 6 so as to be rotated thereby. This results in rotation of the inclined plate 15 so that the lever 16 which is engaged at one end beneath the plate 15 is caused to pivot about the pin 17. Such pivotal movement of the lever 16 is arranged to operate the brake applying valve 31 previously mentioned so as to release hydraulic fluid from the chambers 26 in the piston the cylinder unit 25 of the braking system with the result that the brake pads 24 are pressed against the web of the rail by means of the springs 28 included within the units 25. To enable the brakes to be applied manually as well as automatically the lever 16 is formed with an aperture 18 at the end remote from the inclined plate 15 and a transmission element such as a cable may be secured to the lever 16 by means of a bolt or the like received in the aperture 18, such cable being connected to a manually operable lever.

It will readily be apparent that the counter wheel 11 applies to the web 1a a force which is substantially equal to that applied to the web by the wheel 7 so that any forces arising from the contact between the wheel 7 and the rail which would otherwise tend to cause the vehicle to sway laterally are compensated by an equal and opposite force applied to the other side of the rail by the counter wheel 11. In this way the stability of the vehicle is ensured. It is important to note that the wheels 7 and 11 are pressed resiliently into contact with the rail 1 at all times regardless of the distribution of the weight of the vehicle between the various running wheels 22 thereof so that in no circumstances, no matter how unfavourable, can either of the wheels 7 and 11 become disengaged from the rail 1. It is also important to note that since the wheels 7 and 11 engage the web of the rail they do not serve to transmit any significant part of the weight of the vehicle onto the rail. This ensures that these wheels operate completely independently of the main wheels which transmit the weight of the vehicle onto the rail. However under some circumstances it would be possible to arrange the driving wheel for the brake actuating device and the counter wheel to engage opposite sides of the running flange 1b of the rail under the influence of similar spring means so that even though the wheels engaged a horizontal part of the rail they would still not serve to transmit any significant part of the weight of the vehicle to the rail.

The counter action of the counter wheel 11 always substantially cancels out any turning moment applied to the vehicle by the wheel 7 even where the distance between the wheels 7 and 11 is varied suddenly, for example as a result of some misalignment of the webs of two longitudinally adjacent rails at a rail joint or a switch point, due to the action of the tension spring 14 which ensures that the two wheels are at all times pressed into contact with the web so as to follow any local variations in the thickness or disposition thereof.

In some circumstances the brake actuating device and the wheels 7 and 11 may be carried by a special vehicle which is not actually equipped with the brakes. In this case such vehicle may be associated with another special vehicle which carries the whole of the brake system apart from the control valve and the brake applying device.

Such two special vehicles would then be coupled together and the control valve in the vehicle carrying the brake actuating device would be connected to the brake system in the brake vehicle by means of a hydraulic hose. Several such brake vehicles could be associated with a single speed detecting vehicle so that the total braking force applied to the rail could be varied according to the overall weight of a train of vehicles of which the speed detecting and brake vehicles form a part. Such train of vehicles may be driven by a tractor vehicle including a motive power unit, or it could be towed by means of a traction cable extending along the track.

The present invention is not applicable only to overhead monorail systems, but can also be applied to ground mounted monorail systems in which the vehicles are disposed above the track instead of being suspended beneath it as in overhead monorail systems. Additionally the invention can be applied to twin rail track systems.

While the actuating surface which co-operates with the lever 16 is, in the particular example described, afforded by the lower face of an inclined annular plate 15, it will be understood that such an actuating surface could be afforded by any appropriate means, such as by appropriately shaping the outer housing of the centrifugal clutch itself.

What we claim is:
1. A vehicle for running on a rail track comprising:
  (a) a body structure having
    a plurality of main wheels rotatably mounted thereon and transmitting the weight of the vehicle onto said rail track,
    brake means, and
    brake actuating means for actuating said brake means,
  (b) driving means for operating said brake actuating means to actuate said brake means when the speed of said vehicle exceeds a predetermined value, and comprising:
    a driving wheel and
    means for pressing said driving wheel continuously against said rail in a first direction independently of said main wheels,
  (c) compensating means for applying to said rail a counter pressure substantially opposite to that applied to said rail by said driving means, and comprising:
    a counter wheel, and
    means for pressing said counter wheel against said rail in a direction opposite to said first direction independently of said main wheels.

2. A vehicle as claimed in claim 1 wherein said driving wheel and counter wheel are supported by respective bearing means for movement towards and away from said rail by swinging movement about respective parallel axes.

3. A vehicle as claimed in claim 2 wherein said means for pressing said driving wheel and said means for pressing said counter wheel continously against said rail comprise means resiliently coupling said driving wheel and said counter wheel.

4. A vehicle as claimed in claim 3 wherein said means for resiliently coupling said driving wheel and said counter wheel comprises a tension spring.

5. A vehicle as claimed in claim 1 wherein said brake actuating means comprises a centrifugal clutch having:
(a) input means for rotation by said driving means,
(b) output means for rotation with said input means, and comprising:
a generally cylindrical outer housing, and
a helical actuating surface,
(c) clutch means for coupling said output means drivingly to said input means only when the latter is driven at greater than a predetermined rate, and
(d) trip means for actuating said brake means, and comprising:
a lever, and
means for biasing said lever onto contact with said actuating surface.

6. A vehicle as claimed in claim 5 wherein said lever is disposed in vertical alignment with said counter wheel, and said lever and said counter wheel have respective pivotal and rotational axes which are disposed in alignment with one another.

7. A vehicle as claimed in claim 1 wherein said driving wheel and said counter wheel each have a respective peripheral running surface formed from a wear resistant synthetic resinous material with a high coefficient of friction.

References Cited
UNITED STATES PATENTS

| | | | |
|---|---|---|---|
| 2,119,550 | 6/1938 | Loughridge | 188—183 X |
| 3,073,418 | 1/1963 | Bentley | 188—183 X |
| 3,444,964 | 5/1969 | Bartley | 188—41 X |

DUANE A. REGER, Primary Examiner

U.S. Cl. X.R.

188—44, 183